(12) United States Patent
Mestha et al.

(10) Patent No.: US 8,228,556 B2
(45) Date of Patent: Jul. 24, 2012

(54) CONTROL SYSTEM FOR SUPPRESSING BLACK IN IMAGES

(75) Inventors: Lalit Keshav Mestha, Fairport, NY (US); Martin S. Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 775 days.

(21) Appl. No.: 12/390,748

(22) Filed: Feb. 23, 2009

(65) Prior Publication Data

US 2009/0296159 A1 Dec. 3, 2009

Related U.S. Application Data

(60) Provisional application No. 61/056,653, filed on May 28, 2008.

(51) Int. Cl.
*H04N 1/60* (2006.01)
*G03F 3/08* (2006.01)
*G06K 9/00* (2006.01)

(52) U.S. Cl. .......... 358/1.9; 358/518; 382/162; 382/167

(58) Field of Classification Search .......... 358/1.9, 358/518, 2.1, 529, 515; 382/162, 167
See application file for complete search history.

(56) References Cited

U.S. PATENT DOCUMENTS 7,088,470 B2 * 8/2006 Lammens et al. ............ 358/1.9
2007/0070465 A1 * 3/2007 Tzeng et al. ................. 358/518

OTHER PUBLICATIONS

Ogata, Katsuhiko, *Discrete-Time Control Systems*, Second Edition, Chapter 7, "Polynomial Equations Apporach to Control Systems Design", pp. 517-540, Prentice Hall, Englewood Cliffs, New Jersey (1995).
Ogata, Katsuhiko, *Discrete-Time Control Systems*, Second Edition, Chapter 8, "Quadratic Optimal Control Systems", pp. 566-609, Prentice Hall, Englewood Cliffs, New Jersey (1995).
Mestha, Lalit K., Viturro, R. Enrique, Wang, Yao Rong, Dianat, Sohail A., "Gray Balance Control Loop for Digital Color Printing Systems", Proceedings of IS&T's "The 21$^{st}$ International Congress on Digital Printing Technologies (NIP21)", Sep. 18-23, 2005, Baltimore, Maryland.

* cited by examiner

*Primary Examiner* — Charlotte M Baker
(74) *Attorney, Agent, or Firm* — Fay Sharpe LLP

(57) ABSTRACT

A computerized system, method, and software apparatus is presented which reduces the black level of the printing process in order to substantially remove stray black dots from the finished product of a printing output. Black levels are reduced by updating the print engine regions for the colors W, C, M, Y, MY, CM, CY, and neutral and by assigning a weights each color. The values are used to compute CMKY values. These values are then placed in a gain matrix and stored in a computer memory.

19 Claims, 11 Drawing Sheets

CONTROL SYSTEM FOR SUPPRESSING BLACK IN IMAGES

This application claims the benefit of U.S. Provisional Application No. 61/056,653, filed May 28, 2008, the disclosure of which is incorporated herein in its entirety by reference.

BACKGROUND

There is presently in the printing arts an unmet need for a printing system that enables a user to reduce the black level of the printing process in order to substantially remove stray black dots from the finished printing output. Black dots mar the finished output of printing and appear even when the color black is not prominent or even needed in the output. Black dots are caused by print engine drift during the updating of the profile process. The present application discloses a method, a system, and a software apparatus for automatically suppressing black levels in a profile for a printing job.

BRIEF DESCRIPTION

The present application introduces a new color dependent weight profile and a new gain matrix algorithm to emphasize the control of black dots where gain may be thought of as a ratio measuring increase in output due to increase in input. In specific terms, a method to calculate a new gain matrix that offers low gain for black dots automatically in regions where it is not desirable is introduced. The new gain matrix uses the weight profile to emphasize the removal of black dots. A runtime control system is described.

DETAILED DESCRIPTION

Figure 1:
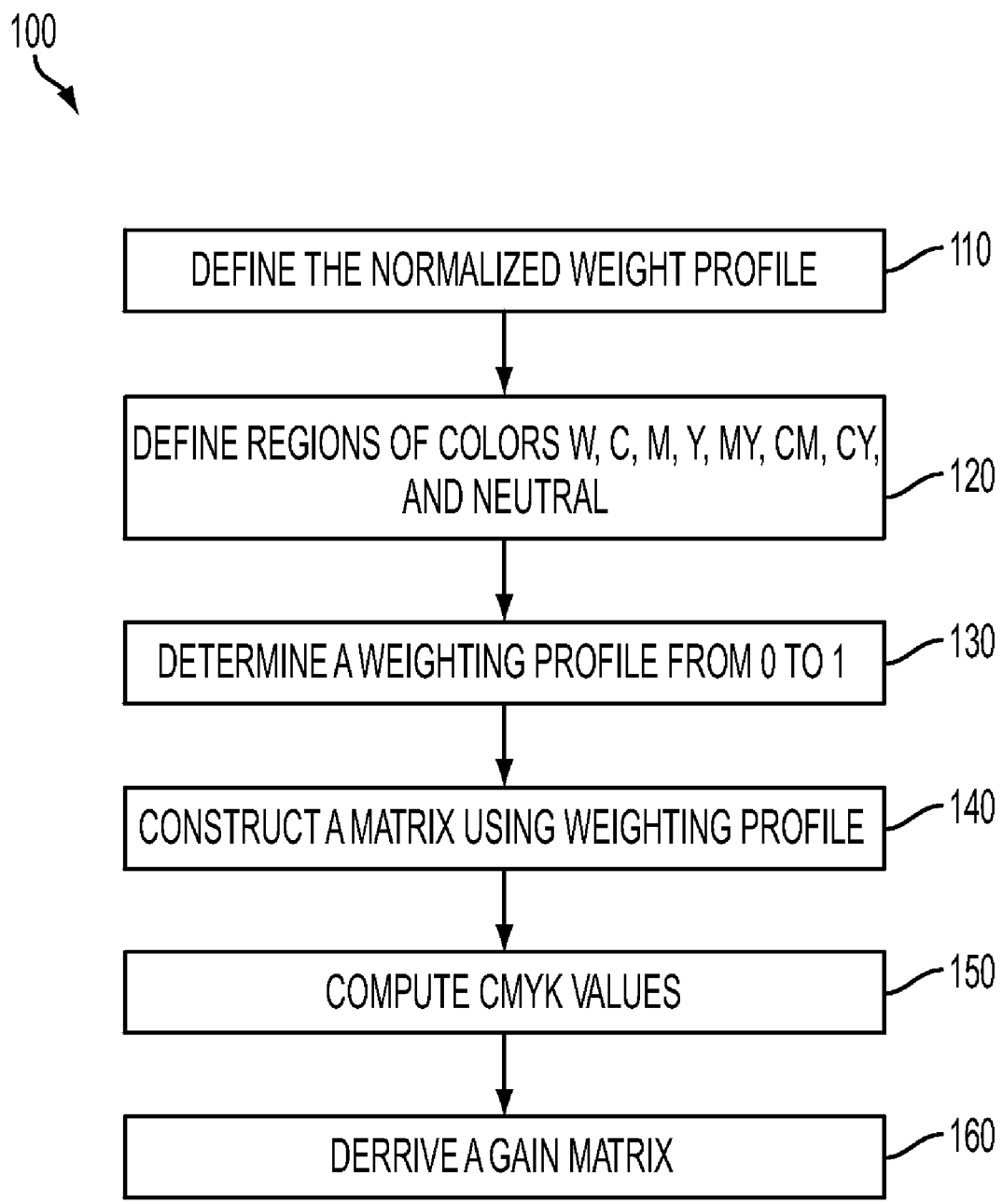
FIG. 1 illustrates a flow chart of the method of updating the profile.

With reference to FIG. 1, a high accuracy controls based advanced destination profiling technology for use in next generation color printing 100 is illustrated. The present embodiment is described in two steps. First the normalized weight profile is defined (normalized to unity), where the user wants control over weights 110. This step involves assigning values to regions of colors W, C, M, Y, MY, CM, CY, and neutral 120, and then determines a weighting profile for each color from a range of 0 to a maximum of 1 being the highest value 130. The next step features a control algorithm that uses the weight profile with appropriate scaling to find the new gain matrix 140. This involves calculating values for CMYK 150 in order to derive a gain matrix 160.

It allows operators to create and update the multi-dimensional L*a*b*/XYZ->CMYK color management profile look up table (LUT) to render high quality RGB and CMYK images. The process of updating the profile LUT involves the following key steps (1) updating of a forward characterization model that maps a device-specific (CMYK) representation to a visual (L*a*b*) color representation, (2) inversion of the printer model using the proper grey component replacement (GCR) to produce a mapping from a visual (L*a*b*) representation to a device-specific (CMYK) representation, and (3) mapping of out-of-gamut colors to the device gamut to preserve the details in images so that the updated profile LUT produces smooth, contour-free, and noise-free pleasing images. The inversion technology uses a 3 to 4 control based algorithm with a multiple input multiple output or MIMO gain matrix. The gain matrix is designed using MIMO pole placement algorithms. During the updating process in the field, due to print engine drift, this approach can inject black toner in regions, where it is not needed even after designing good GCRs with no black. This embodiment shows a method to suppress black automatically from the final profile.

A profile contains a multidimensional color correction look up table (LUT) comprising a series of nodes in input color space (L*a*b* or XYZ), and device-specific (CMYK) output values stored at each node. When the input pixels to be corrected coincide with the nodes of the LUT, the corresponding device specific color values are retrieved directly from the LUT. If the pixels are not on the node, then they are derived via interpolation of neighboring nodes using a standard technique such as tetrahedral interpolation. In the art of color printing, tetrahedral interpolation replaces use of one large memory for the storage of the data table with four small memories are used, the memories being loaded and accessed so that each of the four data points needed for tetrahedral interpolation are always located in separate memories. This allows the four data points to be generated in parallel, thus increasing the speed of transformation without increasing the size of the memory. Destination profile technology is integrated in DocuSP/Freeflow Remote Workflow (FFPS) to let operators create and update the profile LUTs using the Inline Spectrophotometer (ILS) as a sensor.

During the updating process, static GCR LUTs are used. No further preconditioning is applied. Due to print engine drift, the 3 to 4 LUT can request more black than desired.

Figure 2:
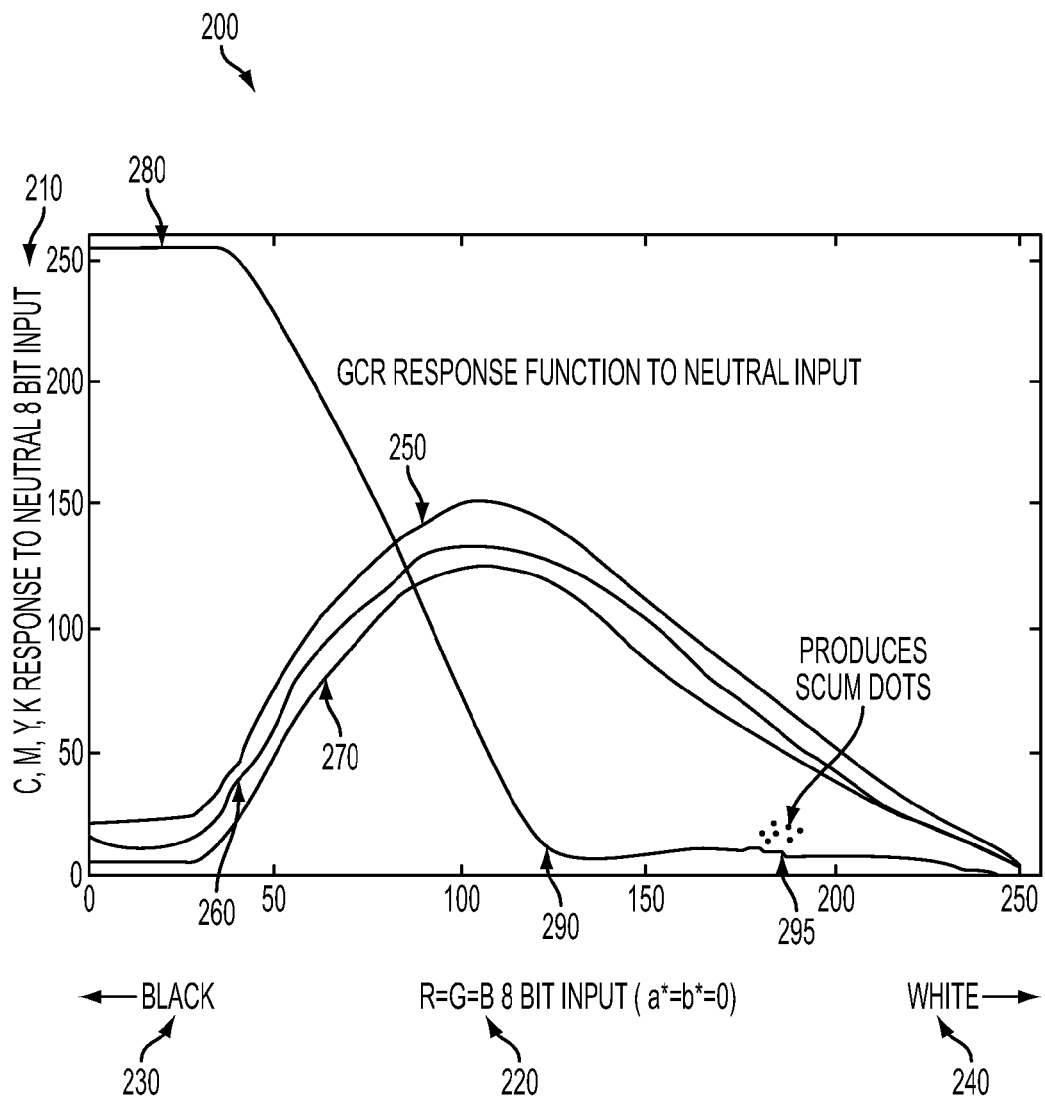
FIG. 2 illustrates a CMYK separation without the K-separation algorithm for 175 dot halftone screen.

With reference to FIG. 2, the quantitative assessment is illustrated graphically 200. Presented is the R=G=B input 220 is on the X-axis, ranging from black 230 to white 240. The Y-axis 210 represents the C, M, Y, K response. The primary colors of cyan 250, yellow 260, and magenta 270 are represented as well as the black level 280. The black level begins at a high level 280 when the value for R=G=B is under 50. After R=G=B reaches 50, the black value 280 begins to decrease rapidly and reach a minimum point 290 at R=G=B of 125. At this point, the values for the cyan 250, yellow 260, and magenta 270 begin to decrease. As the black value decreases, the values of the cyan 250, yellow 260, and magenta 270 begin to decrease. After this point, the black value increases slightly 290 while the values of the cyan 250, yellow 260, and magenta 270 continue to decrease. As black increases and the blue, yellow and red decrease 290, the black color begins to become more prevalent that the blue, yellow and red colors and thus the black scum dots begin to appear 295. The scum dots cause a detriment to picture quality because the scum dots appear in neutral flesh tones or as excessive black in flesh tones, sky tones and other important tone scales and may appear dirty/grainy or non-uniform. It is unacceptable for high quality color rendition. This is particularly enhanced at the neutrals because of the high degree of degeneracy; i.e., the number of CMYK combinations that can produce same color is high near neutrals but is low near the boundary of the gamut. There is only one unique CMYK solution at the surface of the gamut. Similar effects can be seen in FIG. 3.

Figure 3:
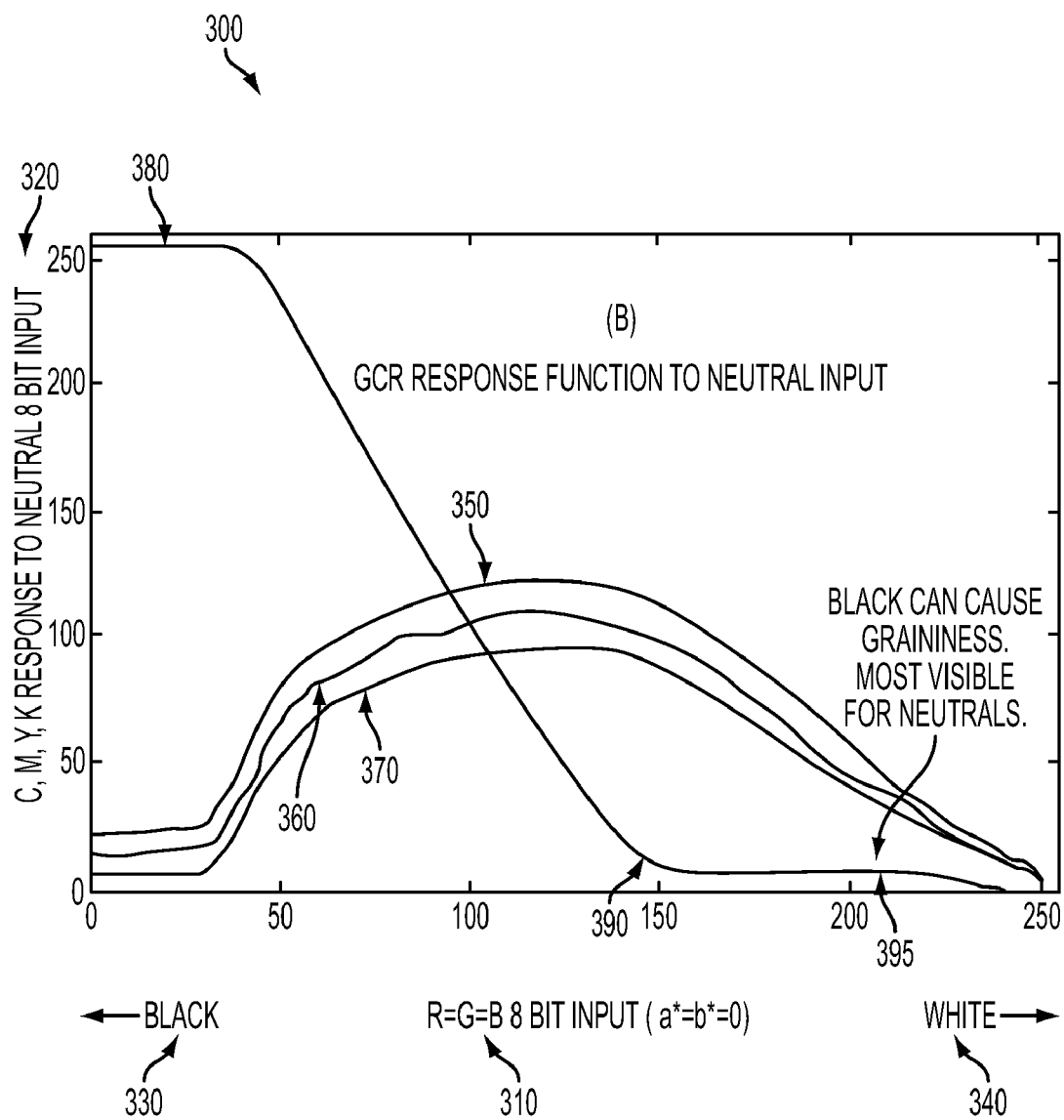
FIG. 3 illustrates a CMYK separation without use of a K-separation algorithm for 200 dot halftone screen.

With reference to FIG. 3, a qualitative assessment for a 200 dot halftone is presented.

The present embodiment is described in two steps. First the normalized weight profile is defined (normalized to unity), where the user wants control over weights. Then a control algorithm that uses the weight profile with appropriate scaling to find the new gain matrix is presented.

Description of Construction of Weight Profile:

The regions where the value of K is equal to 0 are determined by defining 8 individual points. These points are white, C, M, Y, CM, CY, YM, and a point on the neutral axis L*,0,0. The variable L* is a variable set by the user. The default is 50. These 8 points define a gamut, which will be referred to as the no K gamut.

From this gamut, the weight profile LUT id determined. The values in this LUT are normalized to go from 0 to 1 where 1 means no black at all and 0 means black allowed. The value will be 1 in the regions where no K is allowed, and 0 in the regions where K is allowed. This is therefore K suppression LUT.

With reference to FIG. 4, the weight profile to 3 gamut corners from the off-axis neutral L*=55, a*=15.4 and b*=0 point is illustrated. The weights LUT nodes inside the no K gamut could be set to 1 using our gamut mapping algorithms. However this would lead to a sharp transition in K, which might cause contours. Therefore the smoothing method of the LUT is invoked in order to smooth this transition. The smoothing is done by an iterative relaxation technique. At each iteration, the value at a node relaxes towards the average value of the surrounding nodes. The process is controlled by setting a parameter for the smoothing rate (0-1) and the number of iterations. The default settings are iteration=10, rate=0.3.

However, if this is done, then the weight at the top of the printer gamut would be reduced, and it is desirable to keep the weight in that region at 1. Therefore the no K gamut is expanded before doing the gamut mapping and smoothing, so the weight will reach 1 at or before the time the top of the true printer gamut is reached. This is done by moving the white, C, M, Y, CM, CY, and MY no K gamut points away from the L,0,0 point by a scaling factor. The default value for the scale factor is 1.3.

Figure 4A:
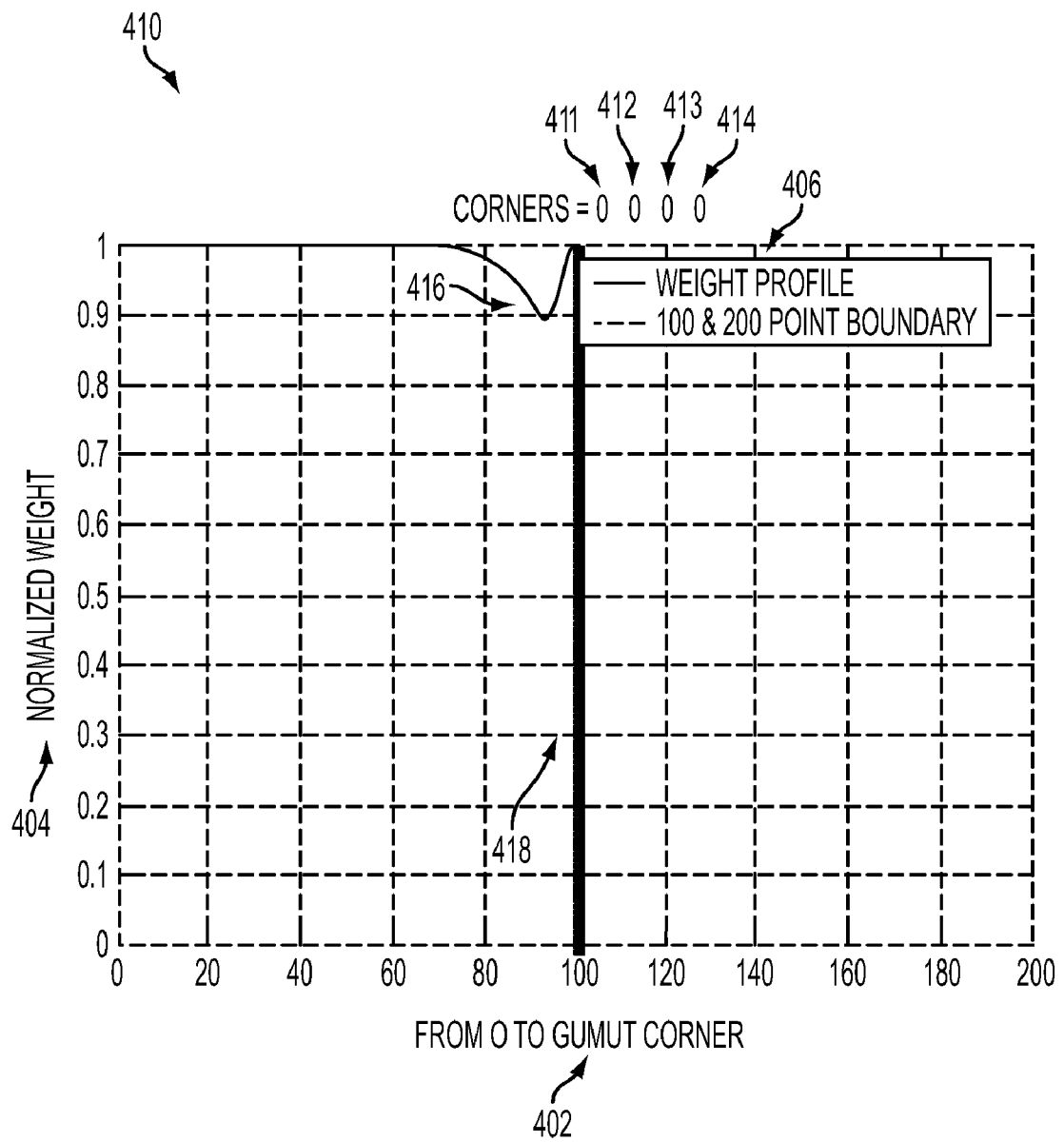
FIGS. 4a, b and c illustrate a weight profiles to 3 gamut colors.

In FIG. 4a, an initial position is shown 410. The X-axis 402 contains 200 discrete points along the line between the neutral point and the gamut corner point. The corner point is shown as 100 units away from the neutral point. The space between 0 to 100 units is the in-gamut axis. An additional vertical line is drawn to show the limit of the input color space of the destination profile. The space between two vertical lines is the accessible out-of-gamut region. The Y-axis 404 contains the weights scaled between 0 to 1.

Adjustment of the cyan 411, the M 412, the Y 413, and the K 414 values has an effect on the weight profile 416 and on the 100 and 200 point boundary 418. In the current scenario, where each corner value 411, 412, 413, 414 is zero, the 100 point and color space limit lines 418 are identical and the weight profile 416 is at a max value of 1 up to and including the 100 gamut level, with a slight dip in weight prior to 100.

Figure 4B:
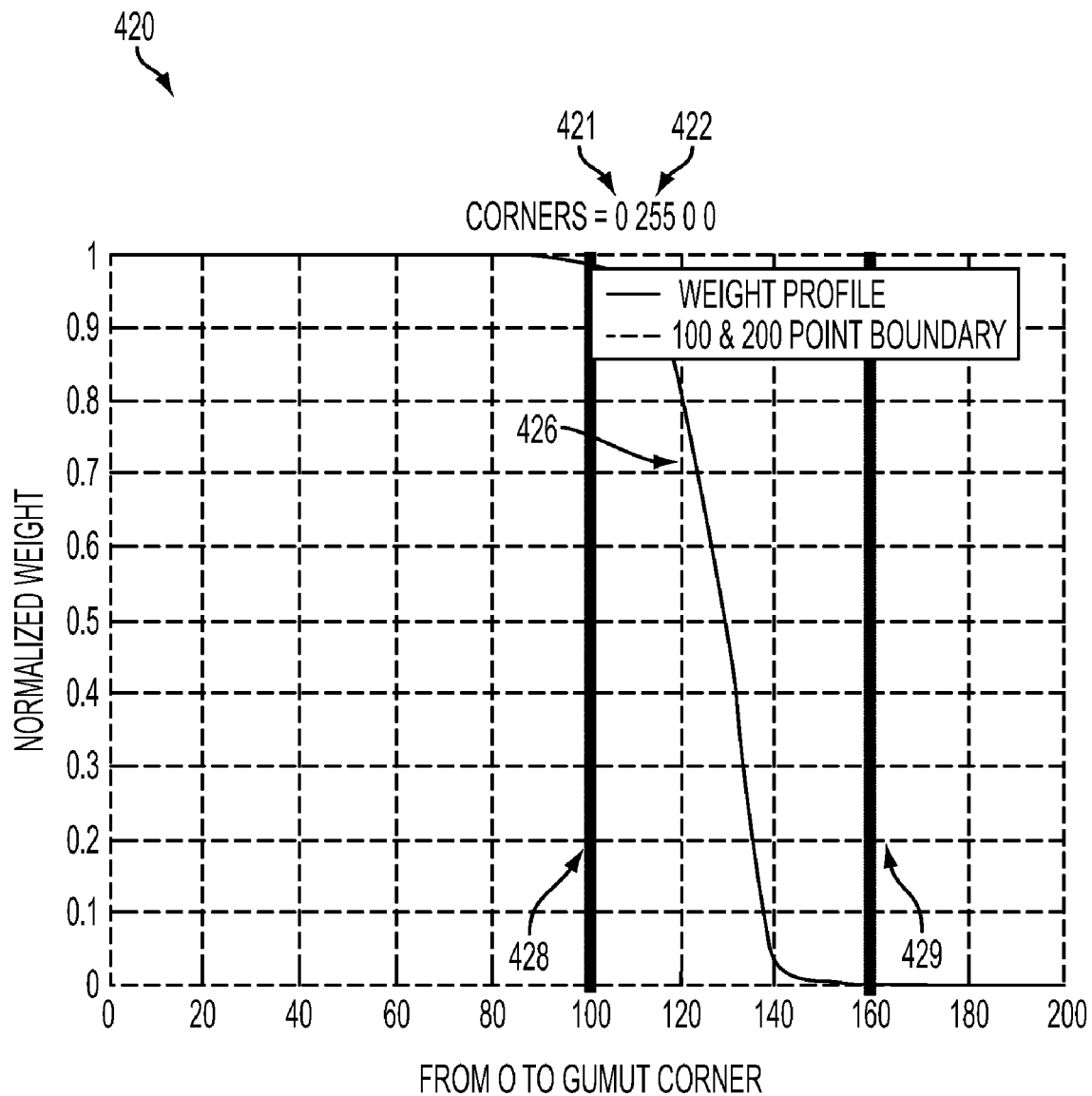

In FIG. 4b, the effect 420 of adjusting the second C, M, Y, K value 421 to the maximum value of 255, while keeping the other values 422 at zero is demonstrated. Here the effect is to move the color space limit 429 right of the original point boundary 428 and to expand the weight profile 426 further out in the gamut.

Figure 4C:
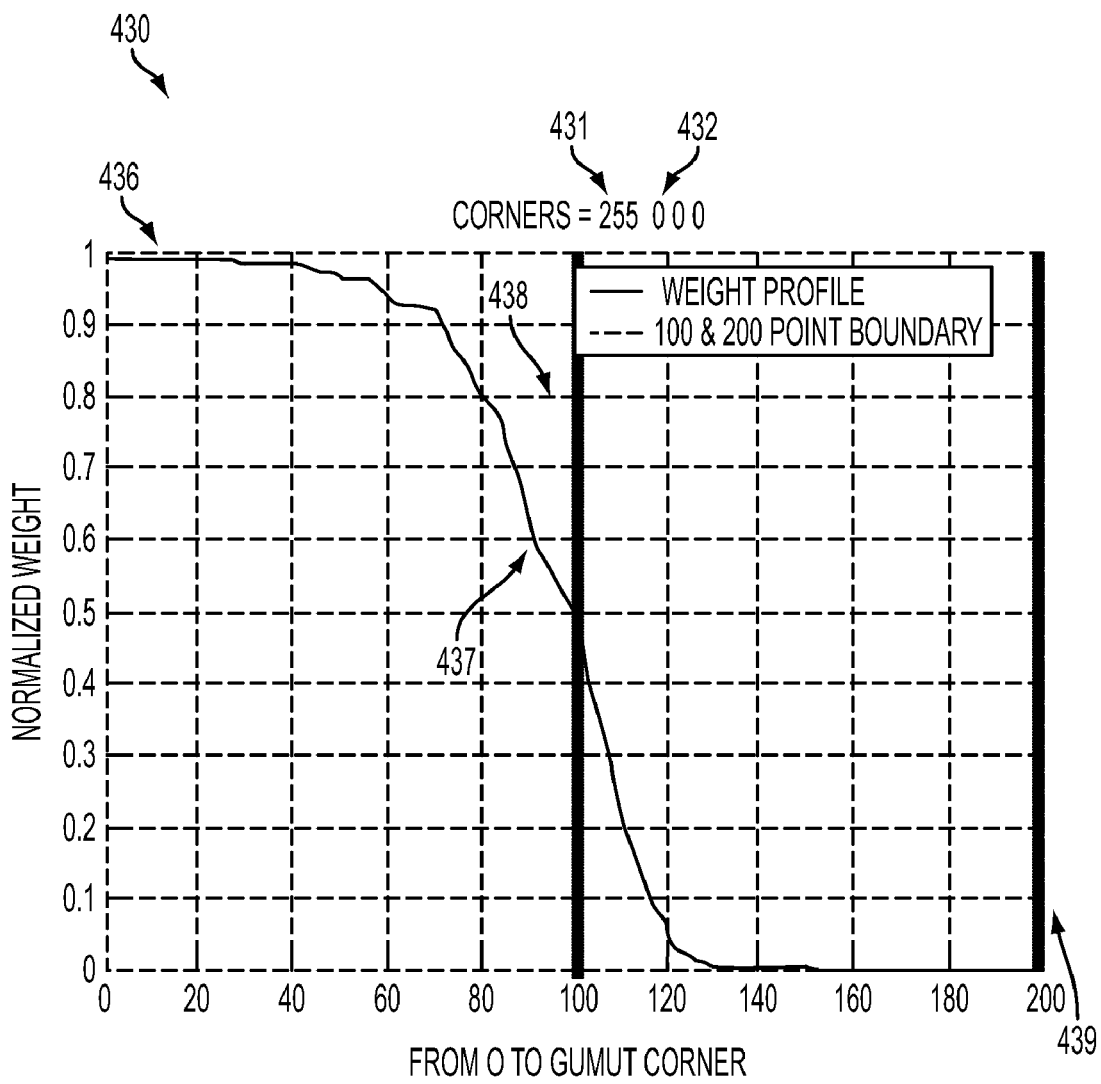

In FIG. 4c, the effect 430 of adjusting the first of the white, C, M, K values 431 to the maximum value of 255, while keeping the other values 432 at zero is demonstrated. Here the effect is to move the color space boundary 439 right of the original point boundary 438 to a maximum value of 200 and to contract the weight profile 436 so it shows a lower weight 437.

Construction of Gain Matrix:

The Linear Quadratic Regulator (LQR) is used for designing the gain matrix of the feedback controller which is used to compute CMYK values at the profile nodes for the updated printer model.

The Linear Quadratic Controller minimizes a selected quadratic objective function for single color (i.e., node color) over the iteration length, N, which is shown below $$J = \frac{1}{2}\sum_{K=0}^{N-1}[X^T(k)Q_X(k) + u^T(k)Ru(k)] \qquad (1)$$

Where x(k) is the state vector containing L*a*b* values and u(k) is the actuator vector for four color system. In this problem, the single color is modeled using the state space formulation described in Reference 3 using the static printer model (or printer) with a 4 inputs and 3 output system. A 3×4 Jacobian matrix, B characterizes the system which is used in conjunction with Equation 1 to derive the gain matrix for each node color. A Jacobian matrix may be defined as a matrix of m functions of n variables. The m×n matrix of which the $i^{th}$ row is the vector of the partial derivatives of the $i^{th}$ function evaluated at the point in question.

As an example, if the goal is to minimize the error vector between the target vector containing node L*a*b* values and the vector formed by L*a*b* values from the printer model (or the measured L*a*b* values from the printer model if iterating on the printer is used), then the objective function could be formed with the sums of the squares of the weighted error (or the state) vector. Additionally, the sums of the squares of the CMYK values (actuators) can be included in the objective function to appropriately weigh the desired actuator. Since the problem is focused in suppressing black with K separation, the values in the Q and R matrices are set as follows.

$Q=\text{diag}[q_1q_2q_3]$ $R=\text{diag}[r_1r_2r_3\alpha]$ $$\alpha=wr+\epsilon \qquad (2)$$

The Q matrix is 3×3 with very small fixed values for the elements; $q_1=q_2=q_3=1\times10^{-3}$.

The R matrix introduced above contains, α as the weight which is used to suppress black. This factor contains the variable 'w' which is a function of the node color. A constant 'r' is a scale value and ε is chosen equal to 0.22 to make sure that the R matrix is always positive definite for all node colors. For some colors, the weight profile, w, will be equal to zero. For those colors, there is a risk of violating positive definiteness condition, if non-zero ε is not used.

Fixed values are used for other variables, $r_1$, $r_2$, $r_3$ and depend on the halftone screen.

For 150 dot screen: $r_1=r_2=r_3=1.5$; r=60
For 175 dot screen: $r_1=r_2=r_3=0.5$; r=60
For 200 dot screen: $r_1=r_2=r_3=1.0$; r=30

Varying the scale value, "/", can allow the K to be suppressed or not. Generally when the user finds excessive black in neutrals, they can change the values for the parameter "r" (anywhere between 0 to 100).

Gain matrix equation is obtained by using the state equation described in L K Mestha et al, "Gray balance control loop for digital color printing systems", Published in the proceedings of IS&T's "The 21st International Congress on Digital Printing Technologies (NIP21)" Sep. 18-23, 2005, Baltimore, Md. (equation 7), Equation 1, and the Principle of Optimality over the iteration interval 1 to N and can be found in the text book K. Ogata", Discrete-Time Control Systems", Prentice Hall, 1994. The final equations are stated as:

Gain Matrix:

$$K(k)=[R=B^TP(k=1)B]^{-1}B^TP(k+1)A$$

Recursive Equation:

$$P(k)=A^TP(k+1)A-A^TP(k+1)B[R+B^TP(k=1)B]^{-1}B^TP(k+1)A+Q$$

Boundary Condition:

$$P(N)=0 \text{ and } K(N)=0 \qquad (3)$$

It turns out that the state space model for each node color has A matrix which is equal to an identity matrix (i.e., A.=diag[1 1 1]). Also, "k" refers to iteration number.

Figure 5A:
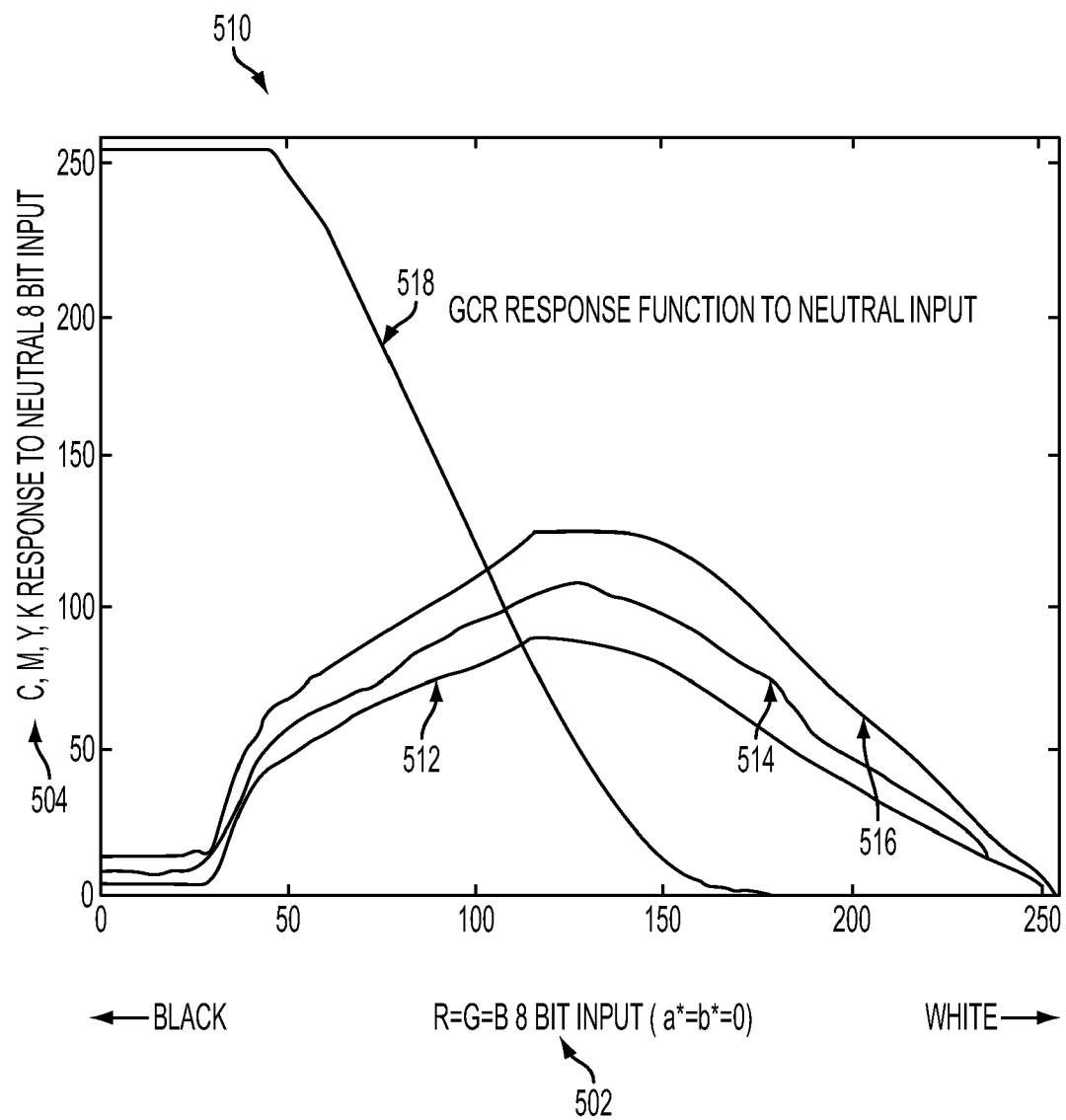
FIGS. 5a, b and c illustrate iGen4 response for R=G=B sweeps for 150 dot, 175 dot and 200 dot halftone screens with black suppression.
Figure 5B:
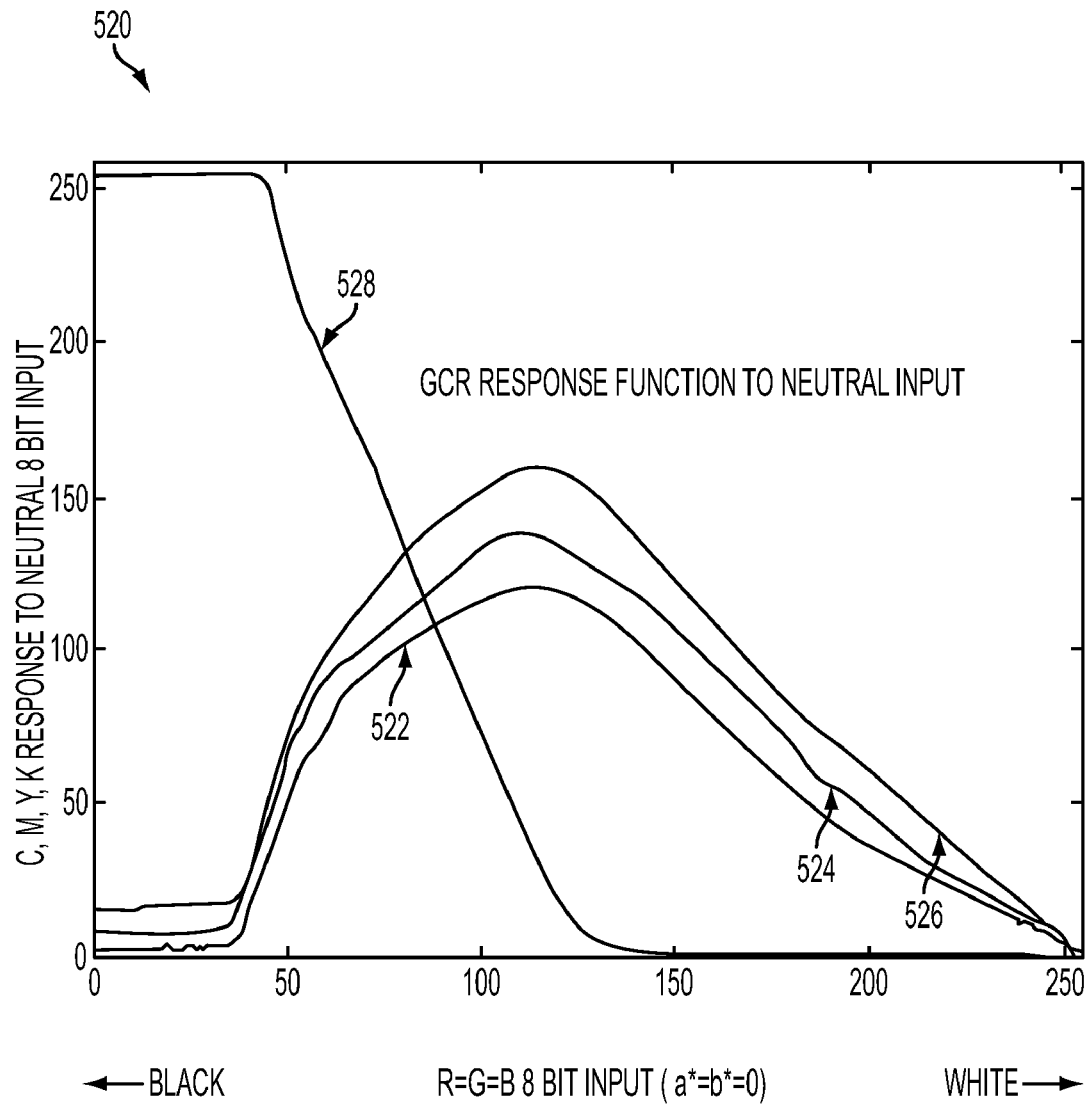
Figure 5C:
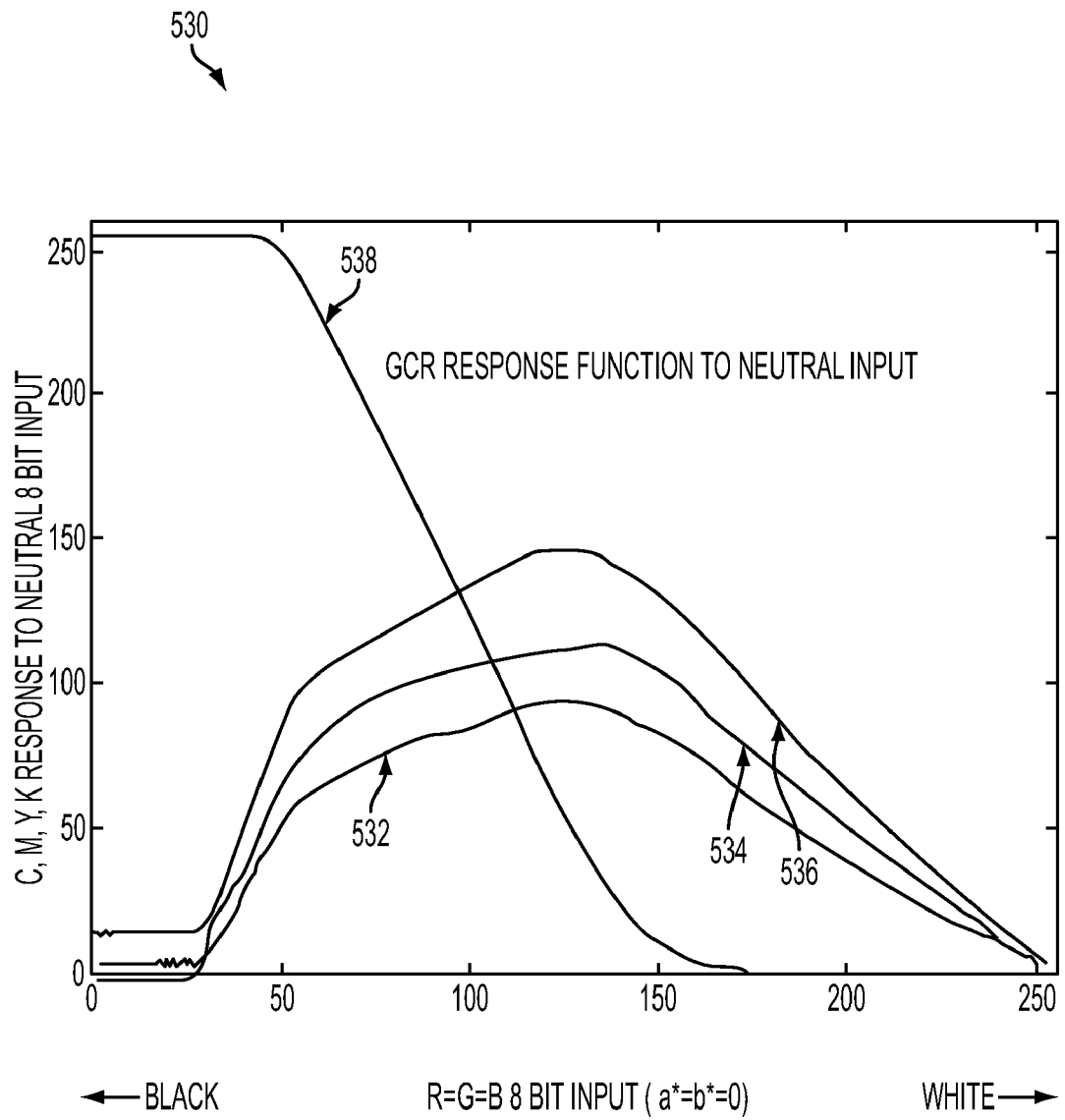

With reference to FIG. 5, a simulation of a 150 dot, a 175 dot and a 200 dot screens and the results for R-G-B neutrals is illustrated. FIG. 5a represents the 150 dot screen 510, which presents the R=G=B 8 Bit output on the x-axis 502, and the C, M, Y, K response on the y-axis 504. Here the magenta 512, the cyan 514, the yellow 516 and the black 518 are presented. FIG. 5b presents the 175 dot screen 520. Here the magenta 522, yellow 524, and cyan 526 peak higher than the previous screen. Also, the black 528 level begins to decline earlier and bottoms out prior to the 150 level. FIG. 5c presents the 200 dot screen 530. Here, the peak on the magenta 532 is lower, the peak on the yellow 534 and cyan 536 are the same, with the gap between magenta 532 and cyan 536 being most pronounced. The black level 538 is at relatively the same or similar level as in FIG. 5a.

Figure 6:
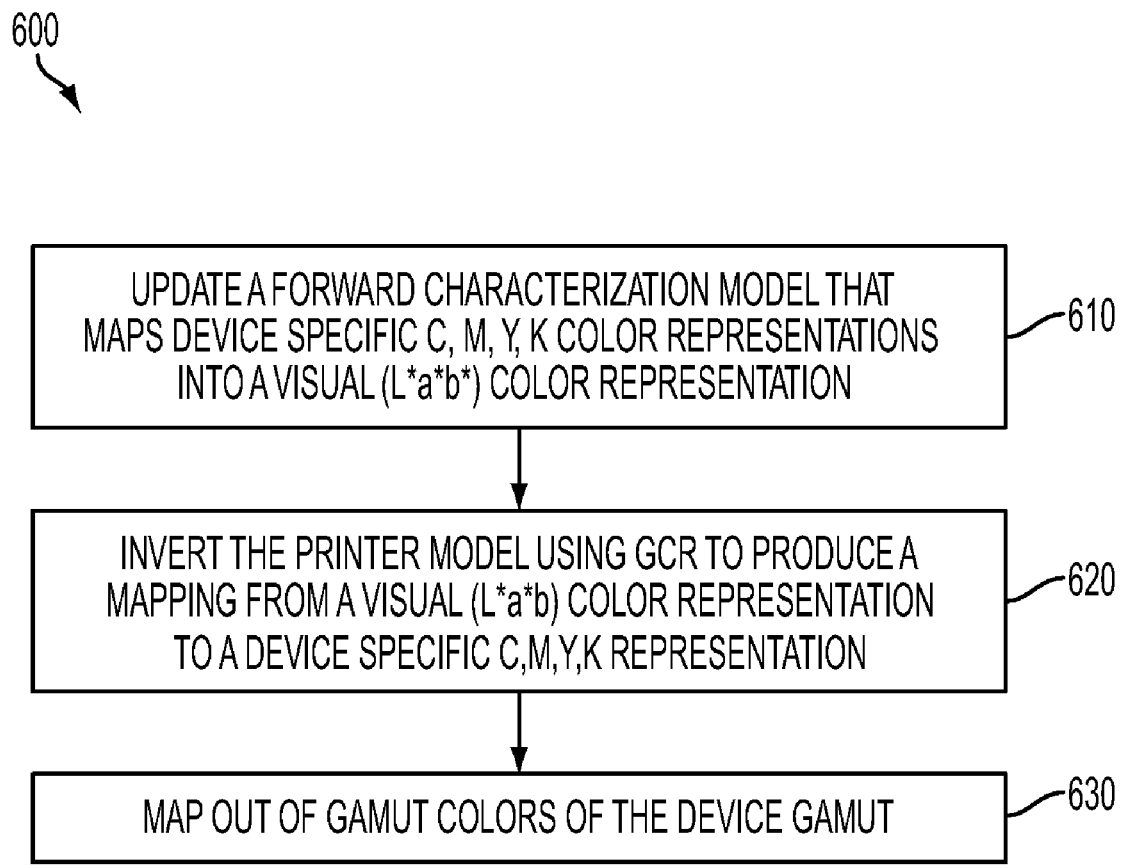
FIG. 6 illustrates a flow chart for the pre-condition method.

With reference to FIG. 6, the updating process 600, comprised of: updating of a forward characterization model that maps a device-specific (CMYK) representation to a visual (L*a*b*) color representation 610, the inversion of the printer model using the proper GCR to produce a mapping from a visual (L*a*b*) representation to a device-specific (CMYK) representation 620, and mapping of out-of-gamut colors 630 is illustrated.

Figure 7:
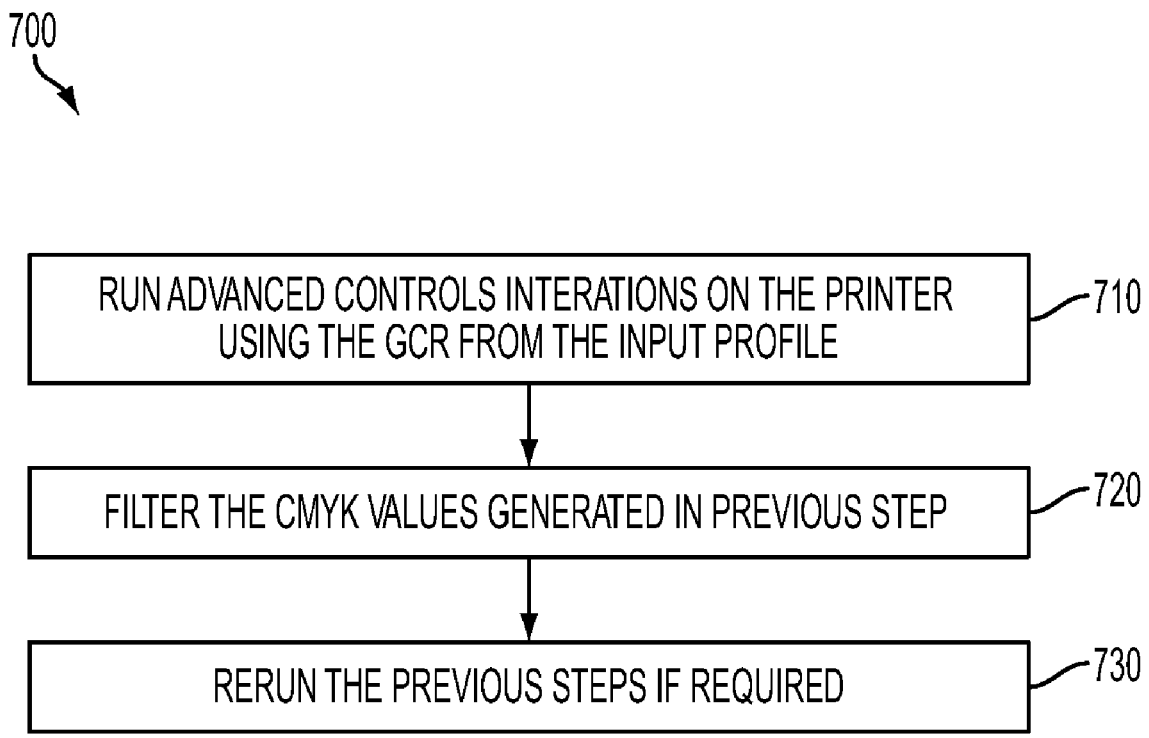
FIG. 7 illustrates the pre-conditioning method.

With reference to FIG. 7, the pre-conditioning method 700 which contains the running steps of: run advanced controls (iterations) on the printer model (or printer) using the GCR from the input profile 710, and filter the CMYK values generated previously 720, and then re-run steps 710 and 720 if required in a computer program 730 is illustrated. These key steps are documented in the extended version of the flow diagram. The GUI based adjustments are used while computing the gain matrices. From the GUI, the user will adjust the parameter, "r" in equation 2 above to suppress K.

It will be appreciated that some of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of suppressing black dots from an image printing comprising:
 a step of defining the weight profile comprising:
  defining regions for the colors W, C, M, Y, MY, CM, CY, and neutral;
  determining a weight profile for each color region in a range from 0 to 1; and
  computing CMYK values iteratively using a feedback controller that uses the weight profile to suppress black in neutral regions.

2. The method of claim 1 wherein the profile comprises a multi-dimensional color correction lookup table.

3. The method of claim 2, wherein the multi-dimensional color correction lookup table is made up of at least one node in input color space.

4. The method of claim 3, wherein the updating of the profile comprises:
 a step of defining the normalized weight profile comprising:
  defining regions for the colors W, C, M, Y, MY, CM, CY, and neutral; and
  determining a weight profile for each color in a range from 0 to 1;
 a step of constructing a matrix using the weighting profile with scaling comprising:
  computing CMYK values using a Linear Quadratic Controller; and
  deriving a gain matrix for each individual color of C, M, Y, K using a function $$J = \frac{1}{2}\sum_{K=0}^{N-1}[X^T(k)Q_X(k)+u^T(k)Ru(k)]$$

and a 3×4 Jacobian matrix.

5. The method of claim 3 wherein the at least one node in input color space store device specific CMKY output values.

6. The method of claim 5, wherein the stored device specific CMKY output values are pixels.

7. The method of claim 5, wherein if pixels are not available to be stored as stored output values, then pixels are derived via interpolation of neighboring nodes.

8. The method of claim 7, wherein the pixels are derived using tetrahedral interpolation.

9. The method of claim 1 wherein the feedback controller comprises: a Linear Quadratic Regulator used for deriving a gain matrix for each individual color of C, M, Y, K using a function $$J = \frac{1}{2}\sum_{K=0}^{N-1}[X^T(k)Q_X(k)+u^T(k)Ru(k)]$$

and a 3×4 Jacobian matrix.

10. A computer software apparatus for updating a printing profile comprising:
 at least one data input terminal for receiving the normalized weight profile from a user where the input is used to define regions for the colors W, C, M, Y, MY, CM, CY, and neutral, and also used to determining a weight profile for each color in a range from 0 to 1;
 at least one processor for constructing a matrix using the weighting profile with scaling comprising at least one processor for computing CMYK values using a Linear Quadratic Controller and deriving a gain matrix for each individual color of C, M, Y, K using a function $$J = \frac{1}{2}\sum_{K=0}^{N-1}[X^T(k)Q_X(k) + u^T(k)Ru(k)]$$

and a 3×4 Jacobian matrix; and a computer operable memory for storing the input values, the calculated values and the matrix.

11. A method of updating a profile comprising:
defining regions for the colors;
determining a weight profile for each region of color;
computing CMYK color values for each region of color; and
deriving a feedback controller with a gain matrix for each region of color used to suppress black in the neutral region.

12. A system for removing black dots from an image printing comprising:
at least one data input terminal for receiving the normalized weight profile where the input is used to define regions for the colors W, C, M, Y, MY, CM, CY, and neutral, and also used to determining a weight profile for each color in a range from 0 to 1; and
at least one processor for constructing a matrix using the weighting profile with scaling comprising: at least one processor for computing CMYK values using a Linear Quadratic Controller and to derive a gain matrix for each individual color of C, M, Y, K using a function $$J = \frac{1}{2}\sum_{K=0}^{N-1}[X^T(k)Q_X(k) + u^T(k)Ru(k)]$$

and a 3×4 Jacobian matrix.

13. The system of claim 12 wherein the weighting profile comprises a multi-dimensional color correction lookup table.

14. The system of claim 13, wherein the multi-dimensional color correction lookup table is made up of at least one nodes in input color space.

15. The system of claim 14, wherein the updating of the profile comprises:
a step of defining the normalized weight profile comprising:
defining regions for the colors W, C, M, Y, MY, CM, CY, and neutral; and
determining a weight profile for each color in a range from 0 to 1;
a step of constructing a matrix using the weighting profile with scaling comprising:
computing CMYK values using a Linear Quadratic Controller; and
a step of deriving a gain matrix for each individual color of C, M, Y, K using a function $$J = \frac{1}{2}\sum_{K=0}^{N-1}[X^T(k)Q_X(k) + u^T(k)Ru(k)]$$

and a 3×4 Jacobian matrix.

16. The system of claim 14 wherein the at least one node in input color space is used to store device specific CMKY output values.

17. The system of claim 16, wherein the device specific CMKY stored output values are pixels.

18. The system of claim 16, wherein if pixels are not available to be stored as output values, then pixels are derived via interpolation of neighboring nodes.

19. The system of claim 18 wherein the pixels are derived using tetrahedral interpolation.

* * * * *